(12) United States Patent
Kaehler et al.

(10) Patent No.: US 8,717,443 B2
(45) Date of Patent: May 6, 2014

(54) METHOD AND SYSTEM FOR TESTING TEMPORAL LATENCY IN DEVICE HAVING OPTICAL SENSING COMPONENT AND TOUCH-SENSITIVE DISPLAY COMPONENT

(75) Inventors: John W Kaehler, Mundelein, IL (US);
Alexander Klement, Wheeling, IL (US);
Mark F Valentine, Kenosha, WI (US);
Sandeep Vuppu, Wheeling, IL (US);
Daniel H Wagner, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 13/564,451

(22) Filed: Aug. 1, 2012

(65) Prior Publication Data

US 2014/0036095 A1    Feb. 6, 2014

(51) Int. Cl.
*H04N 17/00* (2006.01)

(52) U.S. Cl.
USPC .......................................................... 348/187

(58) Field of Classification Search
USPC ............... 348/187, 189, 552, 553; 702/19, 20
See application file for complete search history.

(56) References Cited

U.S. PATENT DOCUMENTS

| | | | |
|---|---|---|---|
| 4,771,183 | A | 9/1988 | McGlynn |
| 4,931,647 | A | 6/1990 | Hiruma et al. |
| 5,283,559 | A | 2/1994 | Kalendra et al. |
| 5,514,504 | A | 5/1996 | Iijima et al. |
| 7,589,714 | B2 | 9/2009 | Funaki |
| 8,521,439 | B2 * | 8/2013 | Mott et al. ...................... 702/19 |
| 2004/0183787 | A1 | 9/2004 | Geaghan et al. |
| 2010/0090984 | A1 | 4/2010 | Na |
| 2012/0044151 | A1 | 2/2012 | Wilson et al. |
| 2013/0278539 | A1 | 10/2013 | Valentine et al. |

FOREIGN PATENT DOCUMENTS

| | | |
|---|---|---|
| EP | 1667457 A1 | 6/2006 |
| WO | 9511461 A1 | 4/1995 |
| WO | 2005121938 A2 | 12/2005 |

OTHER PUBLICATIONS

Brian Crecente, "Robot Gives the Finger to Portable Touch Screens", http://kotaku.com/5501339/robot-gives-the-finger-to-portable-touch-screens, Mar. 24, 2010, 3 pages.

Optofidelity LTD., "Display Test Robot Platforms", http://www.optofidelity.com/en/test-automation/touch-screen-tester, Sep. 15, 2010, 2 pages.

James E. Hewson, "A User-Friendly LCD Touch-Screen Callibration Process", EE Times.com, Dec. 1, 2011, 6 pages.

(Continued)

*Primary Examiner* — Paulos M Natnael
(74) *Attorney, Agent, or Firm* — Whyte Hirschboeck Dudek, S.C.; Sylvia Chen

(57) ABSTRACT

A method and system for determining a camera-to-display latency of an electronic device (100) having a camera (134) and touch-sensitive display (108) are disclosed. In one example embodiment, the method (500) includes receiving (511) first light (136) at the camera, and essentially simultaneously receiving second light (138) at a first photosensitive structural portion (102, 602). The method (500) further includes detecting (512) a first simulated touch input at the display (108) in response to a first actuation of the first photosensitive structural portion (102, 602), receiving third light (140) at a second photosensitive structural portion (104, 604), the third light being generated based at least indirectly upon the received first light (136), detecting (514) a second simulated touch input at the display (108) as a result of the receiving of the third light (140), and determining the camera-to-display latency based at least indirectly upon the touch inputs (516).

22 Claims, 8 Drawing Sheets

(56) References Cited

OTHER PUBLICATIONS

Patent Cooperation Treaty, "PCT Search Report and Written Opinion of the International Searching Authority" for International Application No. PCT/US2013/032880 dated Nov. 7, 2013, 10 pages.

Patent Cooperation Treaty, "PCT Search Report and Written Opinion of the International Searching Authority" for International Application No. PCT/US2013/051761, Feb. 5, 2014, 14 pages.

Marco C. Jacobs et al., "Managing Latency in Complex Augmented Reality Systems", Proc. of the 1997 Symposium on Interactive 3D Graphics, Apr. 27, 1997, pp. 49-54.

H. Harlyn Baker et al., "Understanding Performance in Coliseum, An Immersive Videoconferencing System", ACM Transactions on Multimedia Computing, Communications and Applications, May 2, 2005, pp. 190-210, vol. 1 No. 2.

Marc Olano et al., "Combatting Rendering Latency", Proceedings of the Symp. on Interactive 3D Graphics, Apr. 9, 1995, pp. 19-24.

Miguel Bordallo Lopez et al., "Head-tracking virtual 3-D display for mobile devices", IEEE Computer Soc. Conf. on Computer Vision and Pattern Recognition Workshops (CVPRW), Jun. 16, 2012, pp. 27-34.

\* cited by examiner

METHOD AND SYSTEM FOR TESTING TEMPORAL LATENCY IN DEVICE HAVING OPTICAL SENSING COMPONENT AND TOUCH-SENSITIVE DISPLAY COMPONENT

FIELD

The present disclosure relates to devices having both an optical sensing component such as a camera, and a touch-sensitive display component such as a touch screen and more particularly relates to methods and systems in such devices for determining temporal latency that can exist, during the operation of such a device, between detection of an image at an optical sensing component and subsequent related actuation of a touch-sensitive display component.

BACKGROUND

It is now common for mobile device to have at least one high-resolution camera, as well as a high-resolution touch-sensitive display component, such as a touch screen which includes both an optical display and a touch-sensitive panel. Such components serve to provide valuable functional capabilities to mobile devices, due (at least in part) to the high resolution of these components. For example, in some mobile devices, a digital viewfinder capability is provided by which an image about to be captured by a digital camera can be displayed prior to the image capture occurring (prior to the picture being taken/recorded). Notwithstanding these advantageous capabilities, there typically exists a system-response temporal latency or time delay between when a visual event occurs in real time, when an image corresponding to that event can be captured by the camera, and when an image (or other information) corresponding or based upon that event can be rendered on the optical display. Such a temporal latency can be referred to as the "camera-to-display latency" and, as illustrated figuratively in FIG. 8 (Prior Art), equals the sum of five components, namely, a camera capture latency 2, a camera bus latency 4, a graphics processing unit/central processing unit (GPU/CPU) post-processing latency 6, a GPU-to-display latency 8, and a display frame latency 10.

Such a temporal latency, although acceptable from the standpoint of mobile device performance, nevertheless is something that should be taken into account during design, programming, and/or operation of the mobile device. That is, to achieve desired operation of the mobile device, it is desirable to characterize this temporal latency as a part of platform optimization, and preferably this characterizing can be accomplished quickly. That said, conventional optical-event timing equipment is generally expensive and complex, especially image-processing equipment.

For at least these reasons, as well as possibly others, it would be advantageous if a new method and/or system could be developed for determining or estimating the temporal latency, in a mobile device or other device, between the operation of an optical sensing component (such as a camera) in detecting a visual event and corresponding actuation of a touch-sensitive display component (such as a touch screen) resulting from or based upon the detected event.

DETAILED DESCRIPTION

Figure 1:
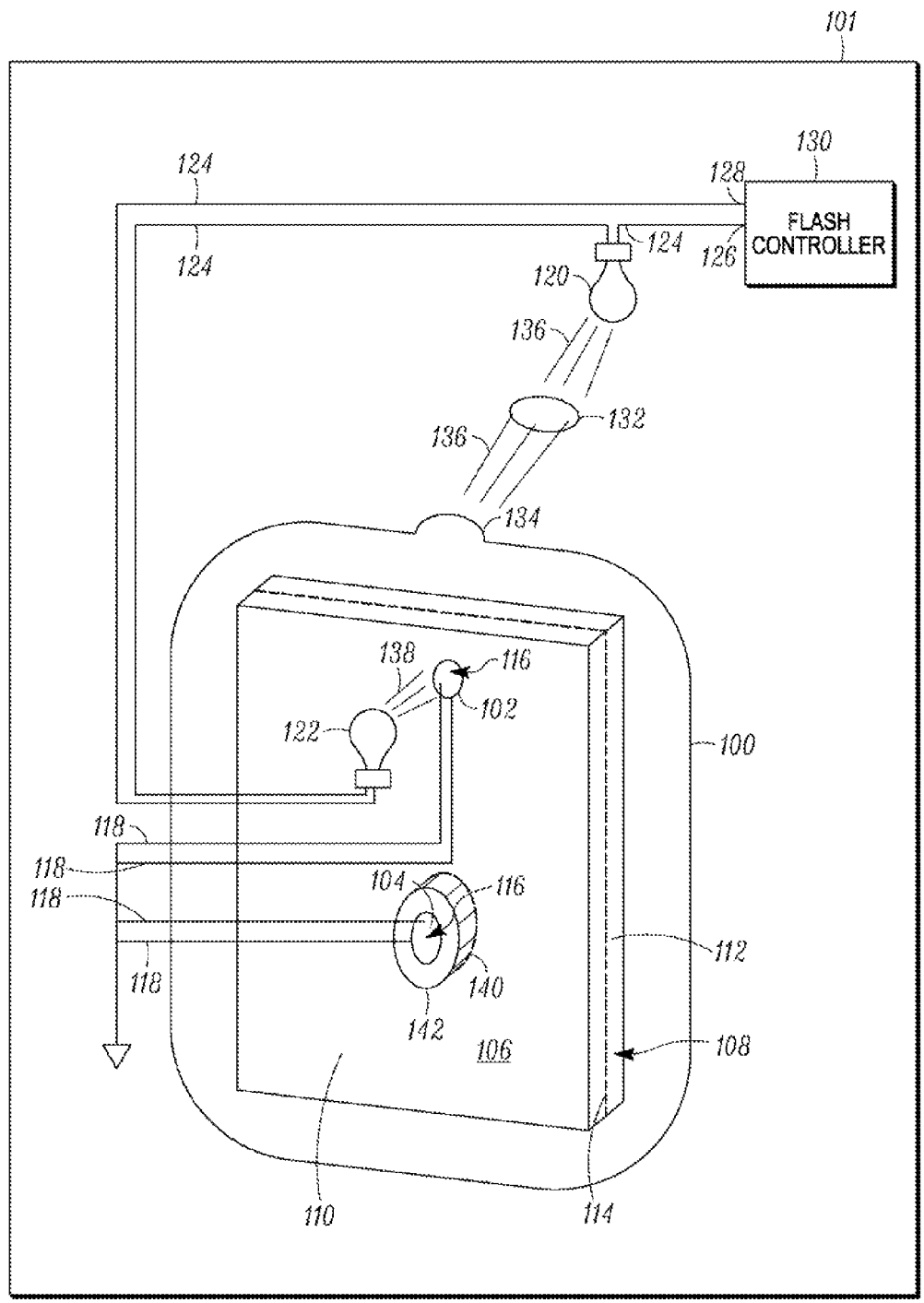
FIG. 1 is a schematic diagram of a test setup in which an electronic device having both a camera and a touch-sensitive display is positioned in relation to several additional components (e.g., a pair of photocells, a pair of light-emitting diodes, a lens, and an additional controller), for the purpose of determining a camera-to-display temporal latency associated with the electronic device, in accordance with a first example embodiment.

The present inventors have recognized an opportunity to develop a new system and method for determining/characterizing the above-described temporal latency between an optical event being captured/detected at an optical sensing component such as a camera and a corresponding display at an touch-sensitive display component such as a capacitive touch screen (or other touch-sensing component having a display associated therewith) triggered by that optical event. The present inventors have recognized that determining/characterizing such a temporal latency can be of value in numerous circumstances, such as when the camera and touch-sensitive display component are being used to operate as a digital camera viewfinder, when an image is captured by a camera and then displayed on the touch-sensitive display component, or in numerous other circumstances. Further, the present inventors have recognized that such temporal latency (which sometimes is referred to herein as "camera-to-display latency") relating to an optical event can be characterized as the delay between two logged touch reports on the touch-sensitive display component through the use of an optically activated touch technology that simulates touches applied to the touch-sensitive display component.

More particularly, the present inventors have recognized that an electrically grounded photoconductive cell or photocell (or photocells), photoresistor, photoconductive panel, or other photoconductive structure made of Cadmium Sulfide (or alternatively possibly made of some other material exhibiting the substantially the same behavior), if positioned so as to be in contact with or proximate to the touch-sensitive display component, can simulate touches when exposed to light coming either from the touch-sensitive display component itself or from another source. This is because the effect of light exposure upon the photocell creates capacitive effects that are similar to those occurring with physical touches (where the photocell serves as a variable capacitor, with the effective coupling area determined by the size and shape of the light pattern that strikes the photocell), particularly when the photocell is connected to ground on a side opposite to the side facing the touch-sensitive display component.

Further, the present inventors have recognized that, through the use of such a CdS photocell (or multiple photocells), if the light to which the photocell is exposed includes two portions of light, namely, (a) first light arising from the touch-sensitive display component that is displaying an image in response to detection of an optical event by a camera (or other optical sensing component), and (b) second light arising from or exactly (or substantially) temporally corresponding to the optical event itself, the photocell then operates to simulate two distinct touches.

Given this situation, it thus becomes possible to log the detection of both the first light and the second light (that is, from the touch-sensitive display component and from the external triggering optical event) by logging the two resulting touch reports produced by the touch-sensitive display component resulting from the actuations of the photocell occurring in response to the first light and second light. Consequently, the camera-to-display latency of a mobile device (or other electronic device or other device) employing such a system and method involving such a photocell can be measured in a fast and simple manner. In this regard, it can additionally be noted that the present inventors have determined, among other things, that CdS energized by light exhibits highly linear resistivity, independent of light wavelength, and therefore is well-suited for such system-level latency testing.

Referring now to FIG. 1, a schematic diagram is provided that shows a test setup in which an example electronic device 100 is arranged in relation to several other components that allows for determination of a camera-to-display latency of the electronic device. More particularly as shown, the electronic device 100 is positioned within a test enclosure 101 that is a light-shielded enclosure (so as to prevent light from entering the enclosure from outside of the enclosure) that is further arranged in relation to a first photocell 102 and a second photocell 104. Each of the photocells 102, 104 can be made from various photoconductive materials depending upon the embodiment, and in the present embodiment each is made of (or includes) Cadmium Sulfide. Although the photocells 102, 104 are shown to be flat circular structures, in other embodiments other photoconductive structures such as photoresistors or a photoconductive panel can be employed and in some such alternate embodiment only a single photocell, photoconductive panel, or other photoconductive structure is employed.

More particularly as shown, the electronic device 100 includes a touch-sensitive display component 108 having both a capacitive touch panel 110 and an optical display panel (e.g., a liquid crystal display, or LCD) 112. As represented by phantom lines in FIG. 1, the touch panel 110 particularly is arranged along the outer surface of the electronic device 100. The photocells 102 and 104 respectively include respective contact surfaces (not shown) that are configured to be positioned adjacent to and extend across respective portions of a complementary surface 106 of the touch panel 110, which is along an outer side of the touch panel (and the electronic device 100). Additionally, the optical display device 112 is arranged within the interior of the electronic device 100 generally extending adjacent to an inner surface 114 of the touch panel 110 that is generally coextensive with the complementary surface 106 but on the opposite side of the touch panel relative to that complementary surface.

Further as shown, outer surfaces 116 of the photocells 102, 104, which are on the opposite sides of those photocells relative to their contact surfaces that contact the complementary surface 106, can be coupled to ground via one or more ground connections, which in the present embodiment are shown to include (as an example) four wires 118 connected in parallel to ground. Although in the present embodiment the four wires 118 are shown (with one pair of the wires being connected to the first photocell 102 and the other pair of the wires being connected to the second photocell 104) the number of ground connections can vary depending upon the embodiment based upon, for example, the number or type of photocells or other photoconductive structures that are being utilized. Further, although the complementary surface 106 of the touch-sensitive display component 108/touch panel 110 is shown to be flat/planar in the present embodiment (as are the contact surfaces of the photocells 102, 104 in contact with that complementary surface), in other embodiments it is possible that these surfaces would have another shape (e.g., convex, concave, or otherwise curved). Regardless of the embodiment, the contact surfaces of the photocells 102, 104 and complementary surface 106 of the touch-sensitive display component 108 will typically need to be adjacent to and in contact with one another (or at least very close to one another) to the extent that it is desired that the conduction operations by the photocells serve to actuate the touch panel 110 as described in further detail below.

Still referring to FIG. 1, the test setup shown further includes several additional components in addition to those already discussed above. In particular, there is provided a first light emitting diode (LED) 120 and a second LED 122 connected in series with one another, by way of several wires 124, between first and second terminals 126 and 128, respectively, of a flash controller module 130, which can be or include any of a variety of processing and/or control devices (e.g., a microprocessor). Also provided is a lens 132. As shown, the first LED 120 and lens 132 are positioned so that the lens is between the first LED and a camera 134 of the electronic device 100, and so that first light 136 emitted by the first LED 120 is directed through the lens 132 and toward the camera aperture for receipt by the camera 134. By contrast, the second LED 122 is positioned proximate to the first photocell 102 and oriented so that second light 138 emitted by the second LED is received by the first photocell. Although the embodiment of FIG. 1 includes the camera 134 for receiving the first light 136, in other embodiments another light receiving component or optical sensor can be employed in place of (or in addition to) the camera for receiving light such as the first light.

Figure 8:
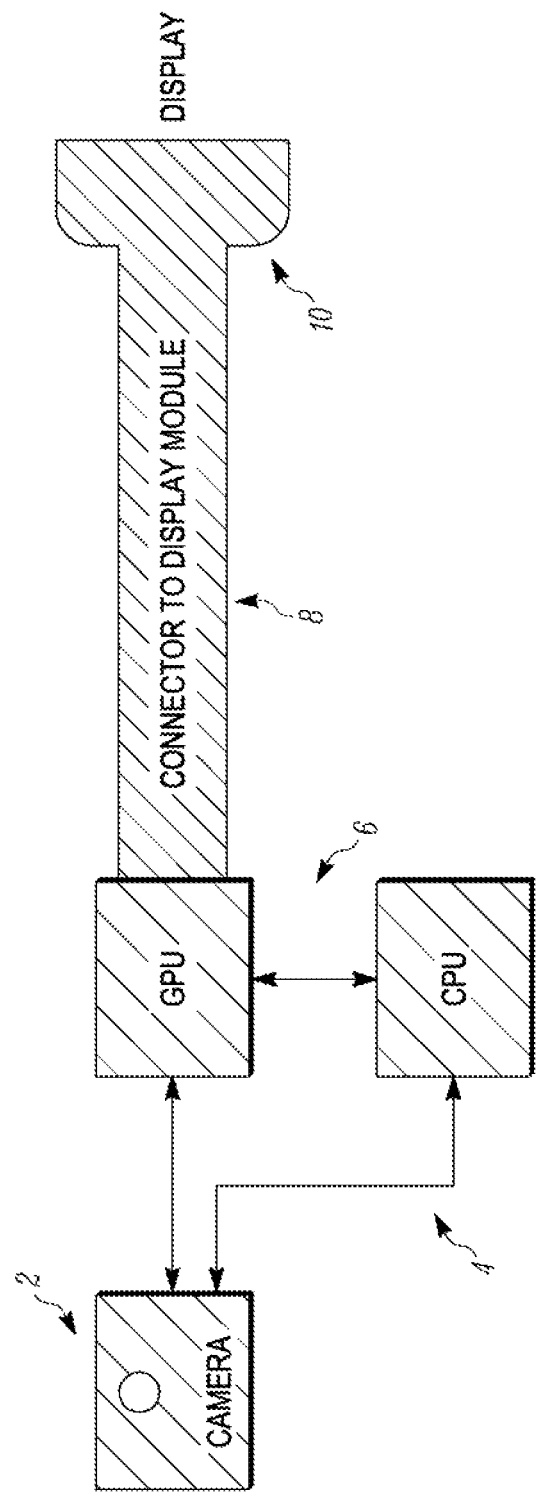
FIG. 8 is a schematic illustrating in a figurative manner five different components of camera-to-display latency (Prior Art) of an electronic device.

Given the arrangement of the components shown in FIG. 1, and particularly the series connection of the first and second LEDs 120, 122, it can be appreciated that actuation of the first LED 120 by the flash controller module 130, which causes the first LED to emit light, is accompanied by simultaneous (or essentially simultaneous) actuation of the second LED 122 such that it also emits the second light 138 at the same (or essentially the same) time. Further, due to the short distances involved, the camera 134 receives the first light 136 emitted by the first LED 120 (transmitted via the lens 132) at the same (or essentially the same) time as the first photocell 102 receives the second light 138 emitted by the second LED 122. Even though this is the case, because the electronic device 100 will typically have (and for purposes of the present discussion is assumed to have) some nonzero camera-to-display latency as discussed above in relation to FIG. 8, an image displayed by the optical display component 112 that is intended to be immediately displayed based upon receipt of the first light 136 at the camera 134 (and is typically intended to correspond in terms of image characteristics to the first light received by the camera) will not in fact be displayed at the same time as the camera receives that light, or displayed at the same time as the first photocell 102 receives the second light 138 from the second LED 122.

That said, the test setup of FIG. 1 by virtue of the first and second photocells 102 and 104 supports a determination as to the temporal extent of the aforementioned camera-to-display latency. More, particularly, the first photocell 102 is actuated to become conductive as soon as it receives the second light 138 from the second LED 122 but the second photocell 104 is actuated to become conductive only as soon as it is illuminated by third light 140 output by the optical display component 112 and transmitted through the touch panel 110 so as to form an image 142 shown to be present along the complementary surface 106 of the touch panel, which in this example is shown to be a circular formation corresponding to the first light 136 received at the camera 134 (via the lens 132) from the first LED 120.

When each of the first and second photocells 102 and 104 is actuated, the respective actuated photocells simulate first and second touches on the touch panel 110, and the times of these two touches can be recorded by the electronic device 100 and the temporal difference between the two determined. By matching the turn-on delays of the two photocells, the difference between the two touch times can be attributed to the camera-to-display latency; thus, the determined temporal difference in the two recorded touches constitutes the camera-to-display latency.

Although not shown, it can be further appreciated that, in at least some embodiments, communications are allowed (either by way of wireless or wired connections) between the electronic device 100 and the flash controller module 130 to allow for coordination between the operation of the flash controller module 130 (particularly its actuation of the LEDs 120, 122) and the operation of the electronic device 100 (particularly its detection and processing of simulated touches received due to actuation of the photocells 102, 104). In some embodiments, the electronic device 100 need not itself perform any processing of detected touches but rather information/signals regarding detected touches, as sensed by the touch panel 110 in response to actuation of the photocells 102, 104, can be provided to the flash controller module 130, which in turn uses the information/signals to determine the camera-to-display latency. Alternatively, in some other embodiments, a flash controller module or other control device distinct from the electronic device need not be employed, but rather it can be the electronic device itself that controls actuation of the LEDs 120, 122 in addition to detecting simulated touches and processing the touch information to determine the camera-to-display latency.

Figure 2:
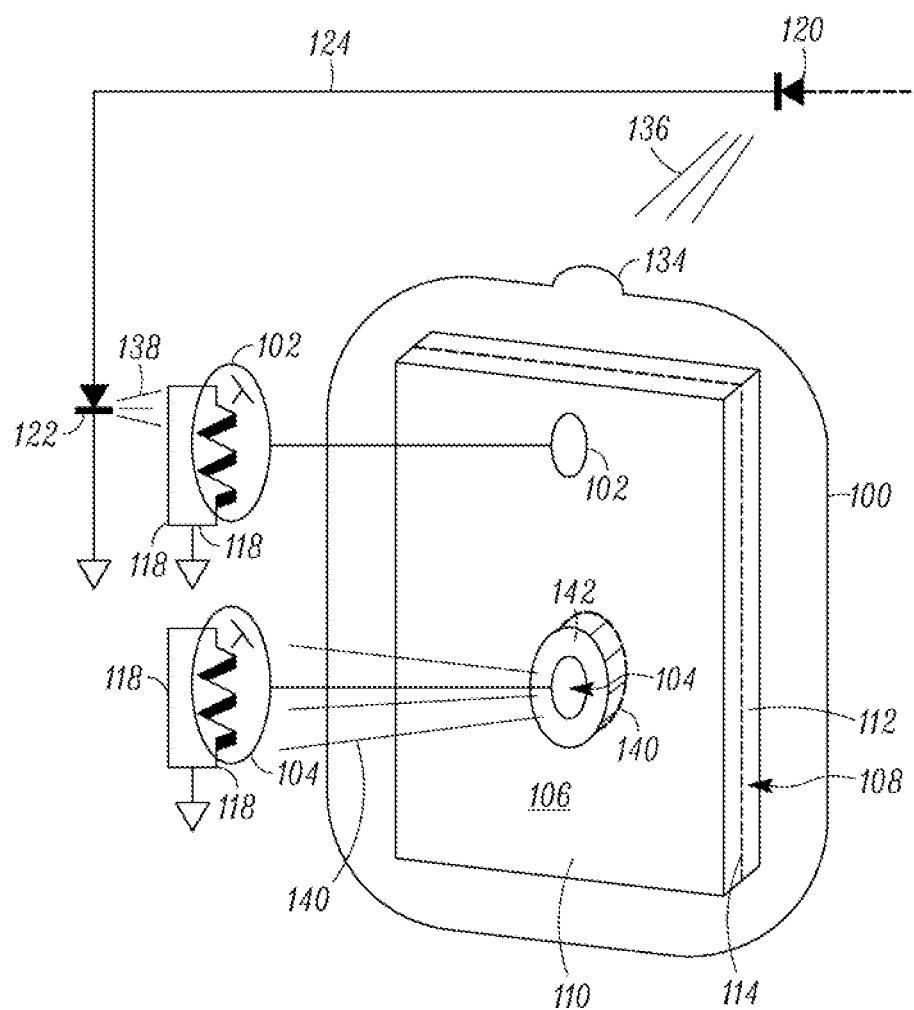
FIG. 2 is an additional diagram illustrating in a further schematic manner the test setup of FIG. 1.

Although FIG. 1 shows an example embodiment of a test setup, FIG. 2 is additionally provided to illustrate, in an additional schematic manner, primary components of the test setup of FIG. 1 and the generation of the first and second simulated touches on the touch panel 110 in response to actuation of the first LED 120 and second LED 122. The schematic representation provided in FIG. 2 is particularly provided to serve as a basis for comparison of the test setup of FIGS. 1 and 2 with another embodiment of test setup shown in FIG. 6, which is described further below. For simplicity, certain components are not shown in FIG. 2 even though those components are present in FIG. 1, such as the lens 132 and the flash controller module 130, and it should be understood that these components are in fact present in FIG. 2 just as the components are present in FIG. 1.

It should further be appreciated that the electronic device 100 of FIGS. 1 and 2 (and other electronic devices encompassed herein) can take any of a variety of forms depending upon the embodiment or circumstance. For example, in the present embodiment, the electronic device 100 can be a smart phone, which is a mobile device. Nevertheless, the present disclosure is intended to encompass and be implemented in relation to any of a variety of electronic devices that can include capacitive touch panels, touch screens, or other touch-sensitive components including, for example, digital cameras, personal digital assistants (PDAs), headsets, desktop monitors, televisions, MP3 players, battery-powered devices, wearable devices (e.g., wristwatches), radios, navigation devices, tablet computers, laptop or notebook computers, pagers, PMPs (personal media players), DVRs (digital video recorders), gaming devices, remote controllers, PC mouse pads, and other electronic devices. Although the electronic devices such as the electronic device 100 can be mobile devices, in some embodiments the electronic devices can be other than mobile devices, such as electronic devices that are fixed in place or intended to be fixed in place (for example, a kiosk).

The present disclosure is also intended to encompass embodiments and testing procedures that are performed in any of a variety of circumstances. For example, testing can occur during manufacturing of an electronic device including, further for example, testing of a subassembly that includes both the touch system and camera, as well as perhaps one or more other components, but that does not yet constitute the fully-completed electronic device being manufactured. Also, testing can be performed after the entire electronic device has been fully manufactured (e.g., upon a fully-assembled smart phone), near or at the end of the manufacturing process. Further, testing can be performed upon a fully-completed electronic device at a time after it has been manufactured (e.g., after its sale, for routine maintenance, etc.).

Figure 3:
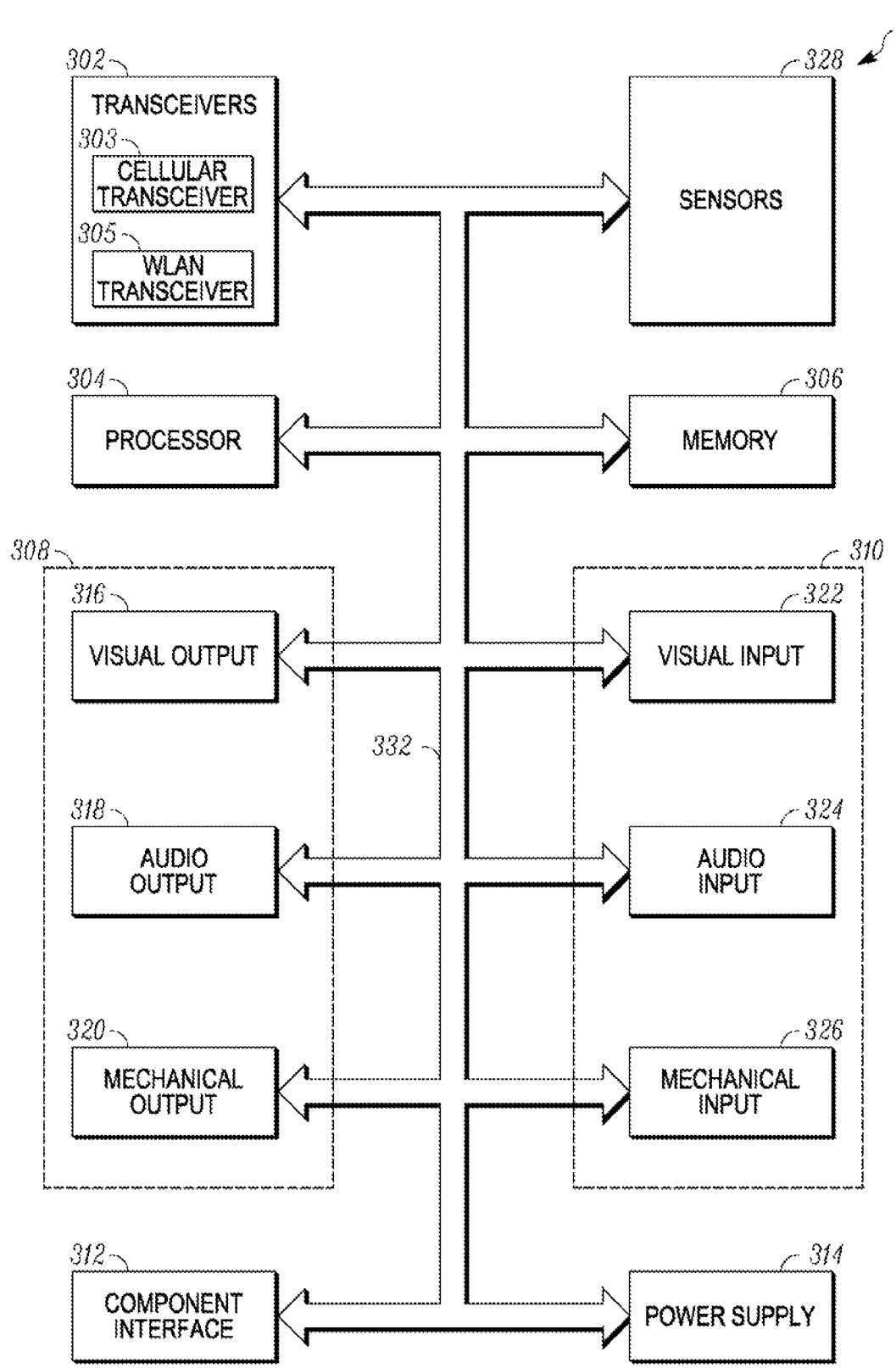
FIG. 3 is a further schematic diagram showing example internal components of a mobile device, which could be the electronic device represented in FIGS. 1 and 2.

As noted above, in one example embodiment, the electronic device 100 is a mobile device such as a smart phone. Turning to FIG. 3, a block diagram shows in more detail example internal components 300 of the electronic device 100 of FIG. 1 and FIG. 2 in accordance with such an embodiment. As shown, the components 300 include one or more transceivers 302, a processor portion 304 (which can include, for example, one or more of any of a variety of devices such as a microprocessor, microcomputer, application-specific integrated circuit, etc.), a memory portion 306, one or more output components 308, and one or more input components 310. In at least some embodiments, a single user interface component is present that includes one or more of the output components 308, such as a display, and one or more of the input components 310, such as a touch sensor. In the present embodiment, the touch-sensitive display component 108 with the capacitive touch panel 110 and optical display panel 112 can be considered to constitute one such combination user interface component.

The internal components 300 further include a component interface 312 to provide a direct connection to auxiliary components or accessories for additional or enhanced functionality. The internal components 300 may further include a power supply 314, such as a battery, for providing power to the other internal components and enabling the electronic device 100 to be portable. All of the internal components 300 can be coupled to one another, and in communication with one another, by way of one or more internal communication links 332 (e.g., an internal bus).

Each of the transceivers 302 in this example utilizes a wireless technology for communication, which can include for example (but is not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), radio frequency identification (RFID), or near field communication (NFC), Bluetooth, IEEE 802.11 (a, b, g or n), or other wireless communication technologies such as infrared or ultrasonic technology. In the present embodiment, the transceivers 302 include a cellular transceiver 303 and a wireless local area network (WLAN) transceiver 305, although in other embodiments only one of these types of wireless transceivers is present (or alternatively possibly neither of these types of wireless transceivers, and/or possibly other types of wireless or wired transceivers is/are present).

Operation of the transceivers 302 in conjunction with others of the internal components 300 of the electronic device 100 can take a variety of forms. Among other things, the operation of the transceivers 302 can include, for example, operation in which, upon reception of wireless or wired signals, the internal components detect communication signals and one of the transceivers 302 demodulates the communication signals to recover incoming information, such as voice and/or data, transmitted by the wireless or wired signals. After receiving the incoming information from one of the transceivers 302, the processor portion 304 formats the incoming information for the one or more output devices 308. Likewise, for transmission of wireless or wired signals, the processor portion 304 formats outgoing information, which may or may not be activated by the input devices 310, and conveys the outgoing information to one or more of the transceivers 302 for modulation to communication signals. The transceivers 302 convey the modulated signals by way of wireless and (possibly wired as well) communication links to other (e.g., external) devices.

Depending upon the embodiment, the input and output devices 308, 310 of the internal components 300 can include a variety of visual, audio, and/or mechanical input and output devices. In the electronic device 100 of FIG. 1, the visual output components 316 particularly include the optical display panel (or video screen) 112 provided by the touch-sensitive display component 108, which can be a LCD display, as well as other devices such as a light emitting diode indicator. The audio output components 318 can for example include parts such as a loudspeaker, an alarm, and/or a buzzer, and the mechanical output components 320 can include other elements such as other types of vibrating mechanisms (e.g., rotary vibrators, linear vibrators, variable speed vibrators, and piezoelectric vibrators).

Likewise, by example, the input components(s) 310 can include one or more visual input components 322, one or more audio input components 324, and one or more mechanical input components 326. In the electronic device 100 of FIG. 1, for example, the mechanical input components 326 not only include the capacitive touch panel 110 of the touch-sensitive display component 108, but also can include other parts such as alpha-numeric keys and/or a navigation element (or navigation cluster), as well as various selection buttons (e.g., a "back" button), a touch pad, another capacitive sensor, a flip sensor, a motion sensor, and a switch. The visual input components 322 can include, for example, infrared sensors or transceivers and/or other optical or electromagnetic sensors, and in the present embodiment further include the camera 134. The audio input components 324 can include parts such as a microphone. Generally speaking, actions that can actuate one or more of the input components 310 can include not only the physical pressing/actuation of the touch panel 110/touch-sensitive display component 108 or other buttons or other actuators, but can also include, for example, opening the electronic device 100, unlocking the device, moving the device to actuate a motion, moving the device to actuate a location positioning system, and operating the device.

As shown in FIG. 3, the internal components 300 of the electronic device 100 also can include one or more of various types of sensors 328 that are coupled to other components by the internal communication links 332. Depending upon the embodiment, the sensors 328 can include any one or more of, for example, accelerometers, proximity sensors (e.g., a light detecting sensor or an ultrasound transceiver), capacitive sensors, temperature sensors, altitude sensors, or location circuits that can include, further for example, a Global Positioning System (GPS) receiver, a triangulation receiver, a tilt sensor, a gyro or gyroscope, an electronic compass, a velocity sensor, or any other information collecting element that can identify a current location or user-device interface (carry mode) of the electronic device 100. For purposes of the present discussion, the sensors 328 will be considered to not include elements that can be considered among the input components 310, such as the touch panel 110, although it should be appreciated that the terms sensor and input component can also easily be defined in a different manner such that some sensors are input components and/or vice-versa.

The memory portion 306 of the internal components 300 can encompass one or more memory components or databases of any of a variety of forms (e.g., read-only memory, random access memory, static random access memory, dynamic random access memory, etc.), and can be used by the processor portion 304 to store and retrieve data. Also, in some embodiments, the memory portion 306 can be integrated with the processor portion 304 in a single component (e.g., a processing element including memory or processor-in-memory (PIM)), albeit such a single part will still typically have distinct portions/sections that perform the different processing and memory functions and that can be considered separate elements. The data that is stored by the memory portion 306 can include, but need not be limited to, operating systems, software applications, and informational data.

More particularly, each operating system includes executable code that controls basic functions of the electronic device 100, such as interaction among the various components included among the internal components 300, communication with external devices via the transceivers 302 and/or the component interface 312, and storage and retrieval of applications and data, to and from the memory portion 306. Each application includes executable code that utilizes an operating system to provide more specific functionality for the electronic device 100, such as file system service and handling of protected and unprotected data stored in the memory portion 306. Informational data is non-executable code or information that can be referenced and/or manipulated by an operating system or application for performing functions of the electronic device 100.

Figure 4:
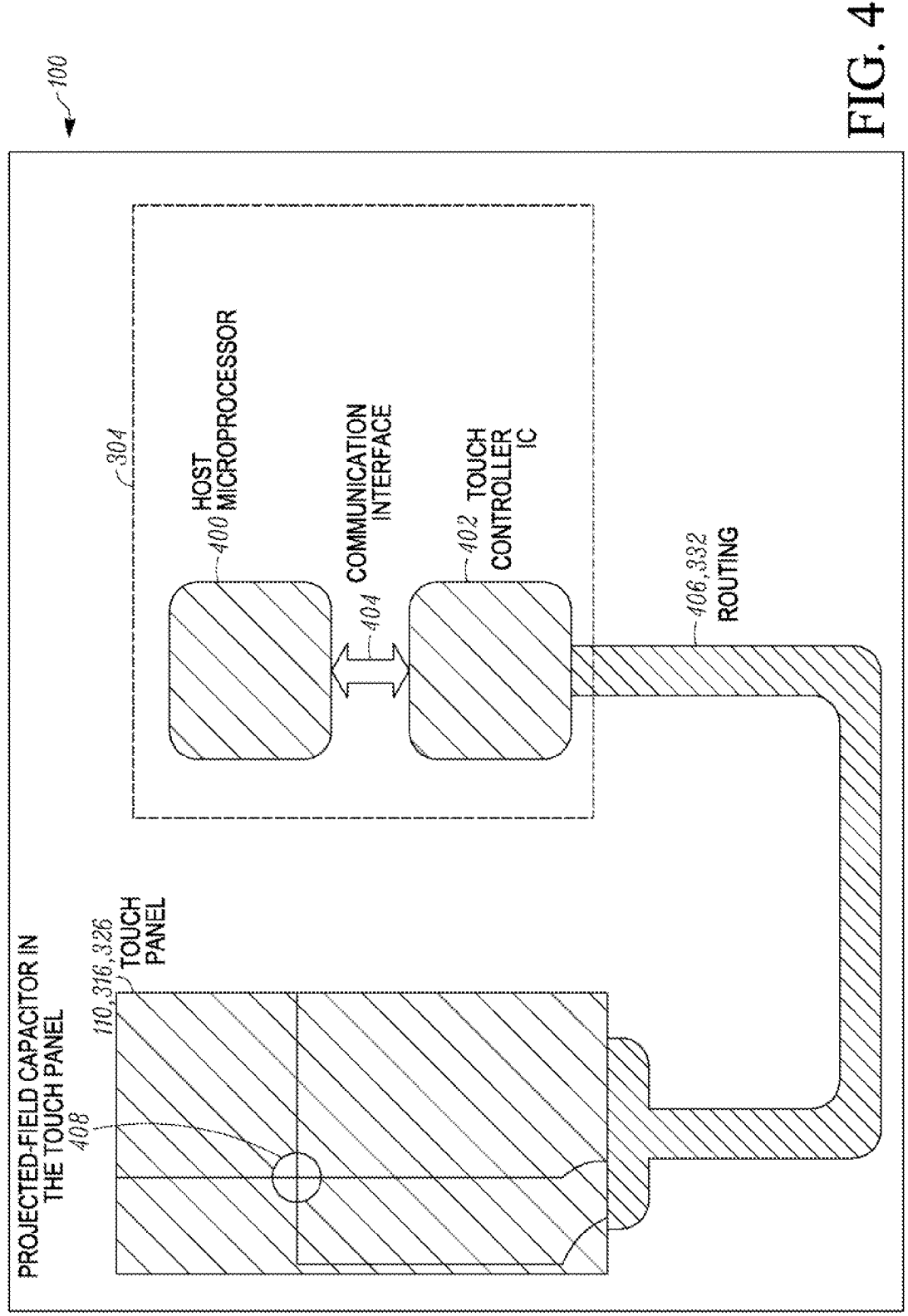
FIG. 4 is an additional schematic diagram illustrating certain internal components of a mobile device, which could be the electronic device of FIGS. 1-3, which shows more particularly a touch panel as well as several other exemplary internal components of the mobile device by which operation of the touch panel is controlled.

Turning to FIG. 4, certain of the internal components 300 of the electronic device 100 (which again in the present embodiment is a mobile device such as a smart phone) are shown in more detail. FIG. 4 particularly shows the touch panel 110 of the touch-sensitive display component 108, which as discussed above includes both the touch panel and the optical display panel 112, and which can be considered both one of the mechanical input components 326 and one of the visual output components 316 of the electronic device 100. In addition to the touch panel 110, the electronic device 100 particularly includes both a host microprocessor 400 and a touch controller integrated circuit 402 that is in communication with the host microprocessor 400 via a communication interface 404, and one or more routing connections 406 connecting the touch controller integrated circuit 402 with the touch panel 110 (or electrodes of the touch panel).

The host microprocessor 400, touch controller integrated circuit 402, and communication interface 404 can all be considered part of the processor portion 304 of FIG. 3, and the one or more routing connections 406 can be considered as constituting part of the internal communication links 332 of FIG. 3 (alternatively, the communication interface 404 can also be considered part of the internal communication links 332). Further, it will be understood that the touch panel 110 includes multiple capacitance-sensing components or elements therewithin, which in the present embodiment are projected-field capacitors embedded in the touch panel, as represented by a single one of the projected-field capacitors 408 shown in FIG. 4. Different one(s) of the projected-field capacitors 408 at different locations within the touch panel 110 are actuated depending upon where the touch panel is touched by a user (or other entity touching the touch panel), or where the photocells 102, 104 are positioned along the complementary surface 106 of the touch panel (such that, when illuminated by the second light 138 or third light 140, the photocells become conductive and simulate touches at those locations).

Figure 5:
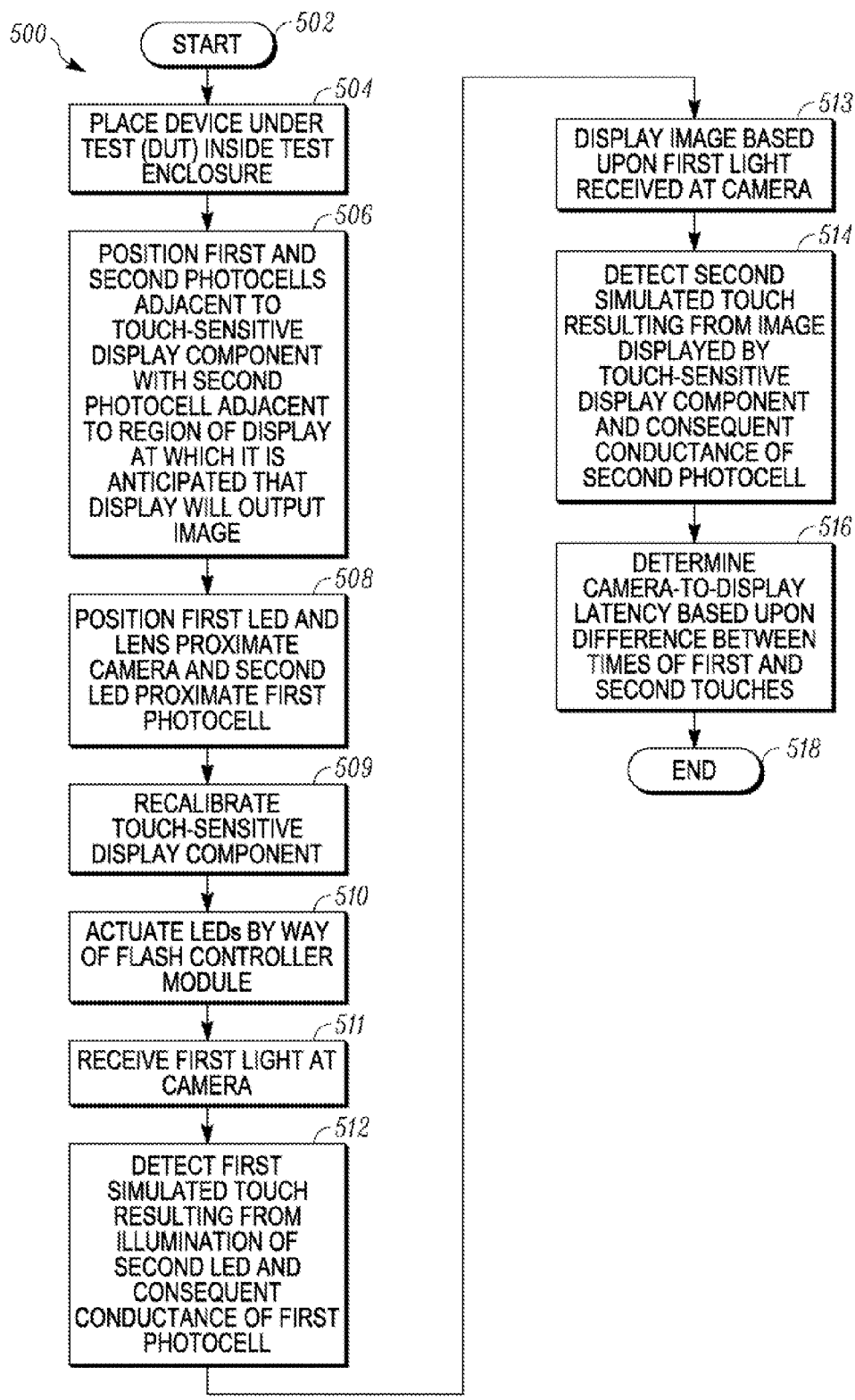
FIG. 5 is a flow chart showing steps of an example process by which the test setup of FIG. 1 can be operated so as to determine a camera-to-display latency associated with the electronic device.

Turning to FIG. 5, a flow chart 500 showing example steps of a process for determining the camera-to-display latency of the electronic device 100 of FIGS. 1, 2, 3, and 4 using the test setup of FIGS. 1 and 2. As shown, upon the process starting at a start step 502, the process advances to a step 504 at which the device under test (DUT), which in this example is the electronic device 100, is placed inside the test enclosure 101. Next at a step 506, the first and second photocells 102, 104 are positioned adjacent to the touch-sensitive display component 108 (more particularly, adjacent to the complementary surface 106 of the touch panel 110 thereof). More particularly, the second photocell 104 is positioned adjacent to a region of the touch-sensitive display component at which it is anticipated that the optical display 112 thereof will output an image in response to the first light 136 begin received by the camera 134. The exact positioning of the first photocell 102 along the complementary surface 106 is less significant, so long as that photocell is positioned so that, when actuated, the simulated touch provided thereby can be sensed by the touch panel 110.

Next, at a step 508, the first LED 120 and lens 132 are positioned proximate the camera 134 (with the lens in between the first LED and camera) such that, when the first LED is illuminated, the first light 136 will be received by the camera. Additionally, at the step 508, the second LED 122 is positioned proximate the first photocell 102 so that, when the second LED illuminates, the second light 138 is directed toward that photocell for receipt thereby. It is presumed, as part of this positioning process, that the first and second LEDs are series-connected between the terminals 126, 128 of the flash control module 130. In other embodiments it is possible that the two different LEDs would not be series-connected but rather can be connected in parallel with one another between the same two terminals 126 and 128, or even connected to different respective terminals of the flash control module.

Further, at a step 509, the touch-sensitive display component 108 (or touch panel 110 thereof) is recalibrated to null out the effect of the de-energized photocells 102, 104 (or open-circuit electrodes, in an alternate embodiment as discussed below in relation to FIG. 6) that make contact with the touch-sensitive display component/touch panel. Additionally in the present embodiment it is presumed that, as part of the step 506, the photocells 102, 104 are coupled to ground as shown in FIG. 1. That said, when discrete photocells are used with a self-capacitance (also known as absolute capacitance) touch system, it can in the alternative be more effective to leave one terminal of the photocell floating, and the other terminal grounded, particularly when the physical area of the photoconductive channel in the photocell is small compared to the total contact area of the photocell.

Although not shown in FIG. 5, it should further be appreciated that in some embodiments one or more of the steps 502, 504, 506, 508, and 509 can also involve or be accompanied by a step in which the electronic device receives a command (e.g., provided by way of an operator) to enter a camera-to-display latency test mode of operation. In such a test mode, the electronic device 100 particularly becomes configured so that it will operate in accordance with additional steps of the flow chart 500 discussed below, and particularly (a) will operate to generate images such as the image 142 on the optical display component 112 corresponding to light received at the camera 134, and (b) will operate to be ready for, and to receive, two touches, and (c) will operate to determine the camera-to-display latency upon detecting such pairs of touches. Such a camera-to-display latency test mode of operation can in some circumstances occur upon initiation of a camera-to-display testing program or software application on the electronic device 100.

After the aforementioned steps are complete, then the camera-to-display latency determination can be performed. In this regard, at a step 510, the flash controller module 130 operates so as to actuate the first and second LEDs 120 and 122, and as discussed above such actuation of the two LEDs is simultaneous (or essentially simultaneous) due to their being series-connected by a short distance. Upon such actuation of the first LED 120, as indicated by a step 511, the first light 136 emanating from the first LED is received at the camera 134. Additionally, and simultaneously (or essentially simultaneously) with the step 511, at a step 512 the touch-sensitive display component 108 (more particularly the touch panel 110 thereof) detects a first touch (or simulated touch) provided by the first photocell 102, which occurs in response to the first photocell 102 receiving the second light 138 from the second LED 122 and becoming conductive in response to receiving that second light. It can be assumed that the reaction of the first photocell 102 to the second light 138, in terms of the photocell transitioning from being non-conductive to conductive, occurs instantaneously or essentially instantaneously, at least by comparison with the camera-to-display latency.

Next, at a step 513, the third light 140 corresponding to the image 142 is emitted from the optical display panel 112 (e.g., in the center of the display panel, in this example, below the positioning of the first photocell 102), with the third light (and the image 142) corresponding to the first light 136 that was received at the camera 134 during the step 511. In the present embodiment, the image 142 (and third light 140) can be directly related to and/or closely correspond to the first light 136 in terms of the image provided by that first light (e.g., in terms of the pattern displayed, the brightness or darkness, color/tint, contrast, etc.). However, alternatively, the image 142 (and third light 140) is only indirectly based upon the first light 136 (and image provided thereby). That is, the present disclosure is intended to encompass numerous variations in which the electronic device 100 processes or transforms image (or other) information represented by the first light 136 into other image (or other) information provided by the display panel as the third light 140.

Further, and simultaneously (or essentially simultaneously) with the step 513, at a step 514 the touch-sensitive display component 108 (more particularly the touch panel 110 thereof) detects a second touch (or simulated touch) provided by the second photocell 104, which occurs in response to the second photocell receiving the third light 140 (corresponding to the image 142) from the optical display component 112. Again it can be assumed that the reaction of the second photocell 104 to the third light 140, in terms of the photocell transitioning from being non-conductive to conductive, occurs instantaneously or essentially instantaneously, at least by comparison with the camera-to-display latency.

Subsequently in response to detecting the first and second simulated touches at the step 512 and 514, the camera-to-display latency can be calculated. Given the above-discussed manner of operation and the above assumptions, the camera-to-display latency equals (or essentially equals) the difference in time between the times of the first and second touches being detected respectively at the step 512 and step 514, that is, the difference time between the performing of the steps 511 and 512 and the performing of the steps 513 and 514. In the present embodiment, this determining is performed, as shown at a step 516, by the electronic device 100 (e.g., by the processor portion 304). However, in alternate embodiments, the determining can instead be performed by the flash-controller module 130 (particularly if the flash controller is coupled to the electronic device to receive signals indicative of the touches detected at the steps 512 and 514, by one or more other devices, or by a combination of devices.

Upon completion of the step 516, the process is ended at an end step 518, albeit it should also be understood that the process can also be repeated in some test circumstances. That is, the end step 518 can be considered representative of an alternate "repeat" step in which the process returns to an earlier step including, for example, the step 510 (in which case, the steps 510 to 516 would be repeated). It can be desirable for the process (or portions of the process) of the flow chart 500 to be repeated for various reasons and/or in various circumstances including, for example, to determine how a change in the software implemented on the electronic device 100 due to a software upgrade (or the like) effects the camera-to-display latency of the electronic device (thus, in such example circumstance, the camera-to-display latency would be tested twice, before and after the software upgrade occurs).

Notwithstanding the above description, the present disclosure is intended to encompass numerous other embodiments of test setups, configurations, and methods of testing in addition to those already discussed. For example, although the above discussion involves a test setup utilizing photocells 102 and 104 employing photoconductive materials (particularly Cadmium Sulfide), in other embodiments test setups can be provided utilizing other components or circuits to generate touches (or simulate touches). Further for example in this regard, FIG. 6 provides a schematic illustration showing primary components of an alternate test setup differing somewhat from that of FIGS. 1 and 2 (and particularly highlighting differences relative to of FIG. 2). In this embodiment, the first LED 120, second LED 122, and electronic device 100 are all the same as in FIGS. 1 and 2, and (although not shown) the flash control module 130 and relative connections among (and configurations of) the aforementioned components can all be the same as in FIGS. 1 and 2. However, by contrast to the embodiment of FIGS. 1 and 2, in the embodiment of FIG. 6 the first photocell 102 is replaced with a first photosensitive circuit 602 and the second photocell 104 is replaced with a second photosensitive circuit 604.

More particularly as shown, the first photosensitive circuit 602 includes a junction gate field-effect transistor (JFET) 606, a metallic touch electrode 608, a phototransistor 610 (in this case, a photoconductive NPN bipolar junction transistor (BJT) phototransistor), and additional circuitry 611 by which the JFET and phototransistor are coupled to ground. More particularly, one of the drain and source of the JFET 606 is coupled to the metallic touch electrode 608, the other of the drain and source of the JFET is coupled to ground, the gate of the JFET is coupled to the emitter of the phototransistor 610 by way of a first resistor, the collector of the phototransistor 610 is coupled to ground, and additionally the emitter of the phototransistor 610 is coupled to ground by the series combination of a second resistor and a battery. The two resistors and battery can be considered additional circuitry 611. In a further alternate variation, the metallic touch electrode 608 can instead be (or be replaced with) a metallic electrode with a semi-conductive coating, such as a compressed layer of conductive electrostatic discharge (ESD) foam, which has the benefit of enabling a large contact area in the on state, without appearing as a floating conductor in the off state.

The second photosensitive circuit 604 in the present embodiment has a structure identical to that of the first photosensitive circuit 602, and particularly includes a JFET 614 identical to the JFET 606, a metallic touch electrode 612 identical to the electrode 608 (or a hybrid metallic/semiconductor electrode as mentioned above as an alternative to the metallic touch electrode 608), a phototransistor 616 identical to the phototransistor 610, and additional circuitry 617 identical to the additional circuitry 611, with all of those components arranged and coupled to one another (and to ground) in the same manner as the components of the first photosensitive circuit 602.

Given their designs as discussed above, the first and second photosensitive circuits 602 and 604 can respectively be positioned in relation to the second LED 122 and the complementary surface 106 of the touch panel 110 in the same (or essentially the same) manner as discussed and shown with respect to the first and second photocells 102 and 104, respectively. In operation, actuation of the metallic touch electrodes 608 and 612 occurs, respectively, in response to the second light 138 and third light 140, respectively (rather than the photocells 102 and 104, respectively), and such actuation serves to provide the first and second touches (or simulated touches) detected at the steps 512 and 514 discussed above. It should be appreciated that the embodiment of FIG. 6 is capable of a higher (faster) speed of operation by comparison with the embodiment of FIGS. 1-2 (which would operate at a lower speed), but also that the embodiment of FIGS. 1-2 would typically have a wide spectral response by comparison with the embodiment of FIG. 6, which would have a narrow spectral response.

Figure 6:
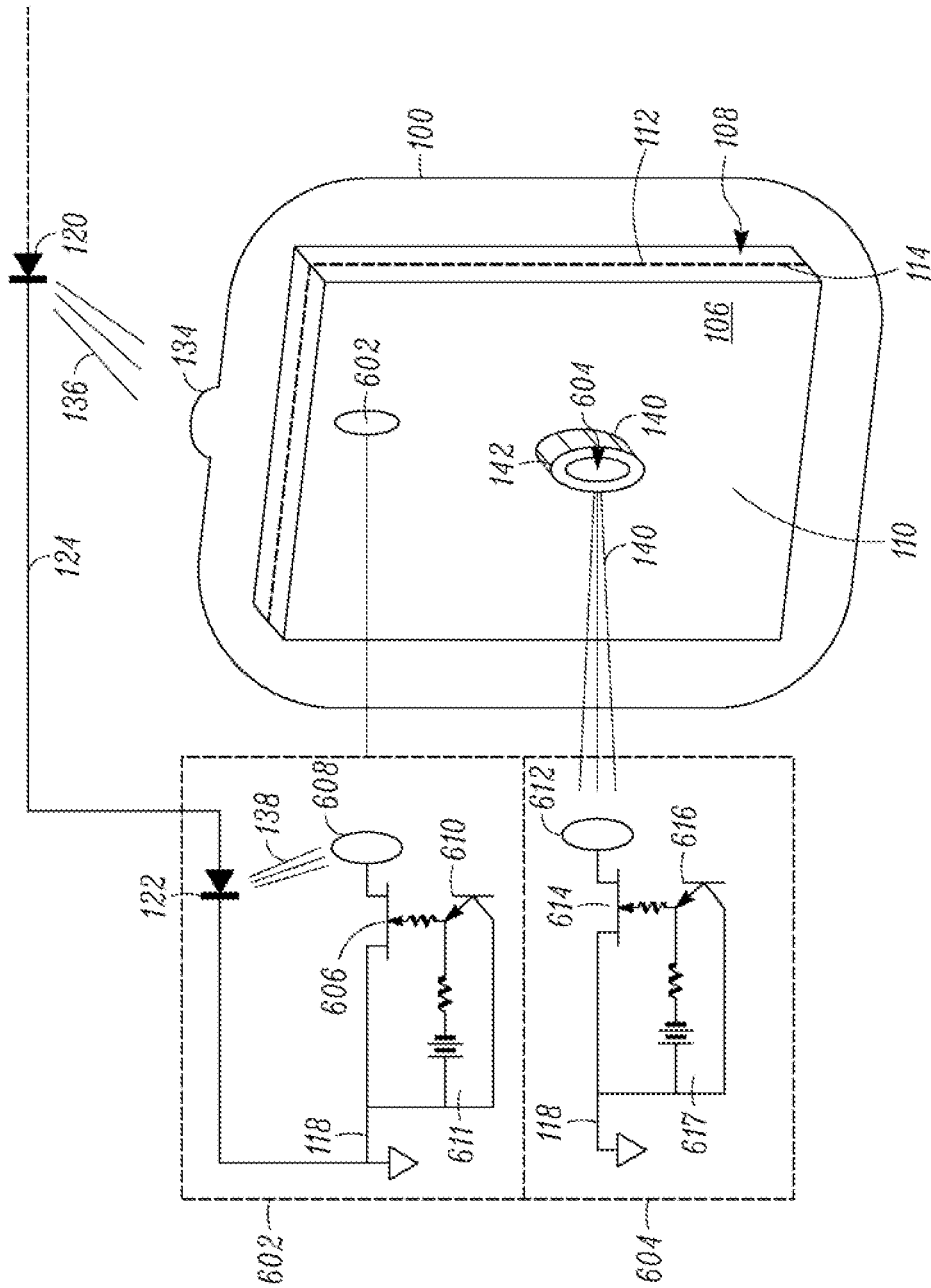
FIG. 6 is an additional diagram illustrating, in a schematic manner similar to that of FIG. 2, an alternate embodiment of a test setup that can be employed for the purpose of determining a temporal latency associated with the electronic device of FIGS. 1, 2, 3, and 4.

It should further be appreciated that the example embodiment of FIG. 6 is only one example of an alternate embodiment of test setup intended to be encompassed herein, and that many other variations are also possible and intended to be encompassed herein. Indeed, a variety of other embodiments are intended to be encompassed by the present disclosure. For example, the present disclosure is intended to encompass numerous embodiments involving displays having any of a variety of display latency characteristics, or utilizing any of a variety of display backlighting technique. Further for example, some displays utilize white LEDs for backlight, and other use RGB (red/green/blue) LED banks. In at least some embodiments, the LED type utilized to activate photocell(s) can match LEDs employed in the touch-sensitive display.

Also for example, in some other embodiments, a method of determining camera-to-display latency involves use of an illuminated objective screen (such as an opaque optical film) to control a total light intensity to which the camera (or other image receiver) is exposed, and which typically would be positioned in the same focal plane relative to the camera (or other image receiver) as the light source transmitting light to the camera (e.g., one of the LEDs 120, 122 such as the LED 120). In at least one such embodiment, shown in FIG. 7, a test setup is employed that is identical to that of FIG. 1 except insofar as the test setup additionally includes an illuminated objective screen 702 and a light guide 704. As shown, the illuminated objective screen 702 is positioned between the first LED 120 and the camera 134, at an objective plane of the camera (such that the camera is focused upon the illuminated objective screen). The light guide 704, which generates and/or directs light onto the illuminated objective screen 702, is connected to and controlled by the flash controller module 130. In alternate embodiments, the illuminated objective screen can be illuminated by way of another light source such an LED or lamp providing side-glow (and/or by way of multiple light sources rather than merely one), and/or the light guide or other light source can be controlled in another manner.

Figure 7:
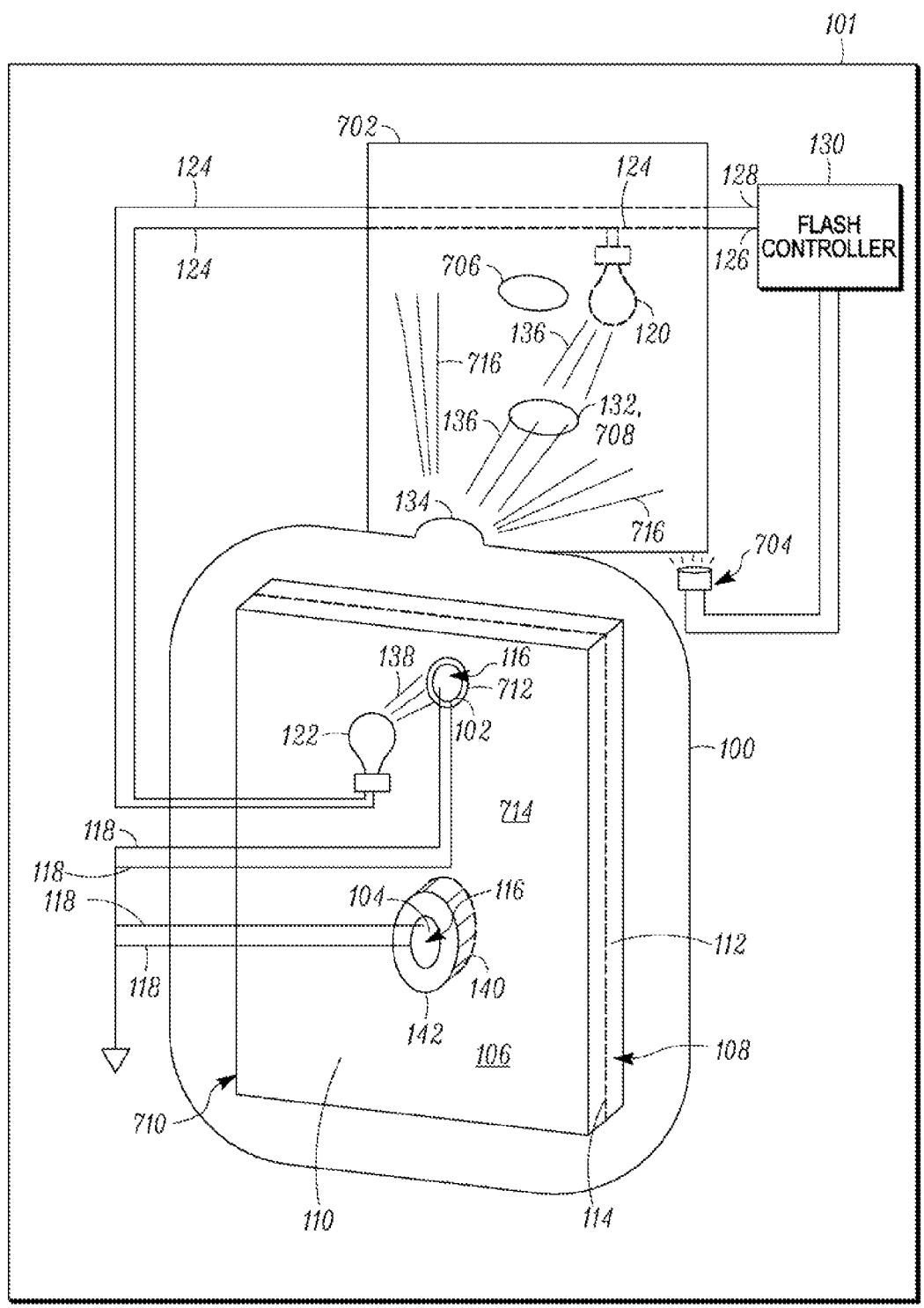
FIG. 7 is a schematic diagram of an alternate embodiment of a test setup that is similar to that of FIG. 1 but that also involves use of an illuminated objective screen.

Further with respect to FIG. 7, as shown, the illuminated objective screen 702 has a first hole 706 and a second hole 708. The second hole 708 is aligned particularly with the first LED 120, so as to be positioned in between the first LED and the camera 134 so that light transmitted from the first LED passes through the objective screen and is received by the camera. In the present embodiment, the lens 132 is shown to be positioned within (and to occupy fully) the second hole 708 although, in other embodiments, such a lens need not be present. By contrast, the first hole 706 is positioned apart from the second hole 708 (in this example, above the second hole) in a particular manner as described further below.

Aside from the regions occupied by the first and second holes 706, 708, the illuminated objective screen 702 becomes illuminated along its entire surface when provided with light from the light guide 704. The nature of screen light 716 given off by the illuminated objective screen 702 along its surface (that is, everywhere but at the holes 706, 708) will depend upon the nature of the screen itself (e.g., the type of optical film used as the screen) and the nature of the light provided from the light guide 704. By virtue of appropriately controlling the light guide 704 or other light source, a variety of levels of illumination of the illuminated objective screen 702 and corresponding levels of the screen light 716 can be achieved. Such illumination can serve to simulate various background light intensities.

Given the illuminated objective screen 702 being positioned in the objective plane of the camera, in the present embodiment the light received by the camera 134 is indicative of not only the first light 136 emitted by the first LED 120 but also the screen light 716 emitted by the illuminated objective screen 702. Further the camera 134 will detect an absence of light from the region corresponding to the first hole 706 and also an absence of light from the region corresponding to the second hole 708 at times when the first LED 120 is shut off. Additionally in the present embodiment, the electronic device 100 operates so that an image 710 output by the optical display component 112 is an image extending across the entire complementary surface 106 of the touch-sensitive display component 108, and is representative of the entire field of view of the camera 134. Thus, the image 710 continues to include the image 142 that corresponds to the first light 136 emitted through the second hole 708 from the first LED 120 when that LED is shut on, or the absence of such light received via that second hole when the first LED is shut off (in which case the image 142 is a dark region). Additionally, the image 710 also includes a dark region 712 corresponding to the first hole 706. Further, a surrounding region 714 of the image 710 corresponding to the illuminated objective screen 702 except for the holes 706, 708 is representative of the screen light 716 emitted from the illuminated objective screen itself and therefore, depending upon the intensity of the screen light 716, can take on a fainter or brighter glow or alternatively be dark when the illuminated objective screen is not illuminated.

As additionally illustrated in FIG. 7, the positioning of the first hole 706 relative to the second hole 708 is particularly set so that, when the electronic device 100 is operating to generate the image 710 based upon the first light 136 and screen light 716, the position of the dark region 712 appearing in the image 710 coincides with the position of the photocell 102, and also the position of the image 142 resulting from the first light 136 (or absence thereof, when the first LED 120 is shut off) coincides with the second photocell 104. That is, the relative positioning of (and distance between) the first hole 706 and second hole 708 are set so that the respective portions of the image 710 (i.e., the dark region 712 and image 142) corresponding to those respective holes that are generated during operation of the electronic device 100 are aligned with the physical positions of the first photocell 102 and second photocell 104, respectively. With this arrangement, therefore, the dark region 712 protects/shields the first photocell 102 (or other photosensitive structural portion) from false activation. Also, although the image 142 is representative of the first light 136 coming from the first LED 120 when that LED is turned on, the image 142 also is dark and protects/shields the second photocell 104 (or other photosensitive structural portion) from false activation when the first LED is shut off.

The embodiment of FIG. 7 allows the test setup to account for the possibility that the camera-to-display latency can change based on the total static light that strikes the camera 134, and to allow for the field of view to have an adjustable "background" light intensity as provided by the illuminated objective screen 702 (and the screen light 716 emitted therefrom). That is, this arrangement provides a benefit of changing and controlling the total static ambient light exposure applied to the camera or imaging device during the camera-to-display latency test. In this arrangement, LEDs may still be switched on and off, and the other aspects of operation of the latency testing remain the same as discussed above with respect to FIGS. 1 and 5.

In addition to those embodiments mentioned above, still additional embodiments are possible as well. Further for example, in some such embodiments involving an illuminated objective screen, the method of performing the camera-to-display latency testing further encompasses manually adjusting the intensity or pattern of illumination of the illuminated objective screen. Also, in some such embodiments involving an illuminated objective screen, the method further includes automatically controlling/adjusting the intensity or pattern of illumination of the illuminated objective screen. Such control can be provided remotely or by the electronic device or other device under test (e.g., a mobile device). Still other methods of illuminating the objective screen include the use of the camera flash in the mobile device under test, possibly controlled by the same test software running on the same mobile device undergoing camera-to-display latency testing.

Additionally for example in this regard, the electronic device or other device under test (e.g., a mobile device) can emit audible tones under the control of internal test software to change the pattern or intensity of the illumination on the illuminated objective screen. That is, by outputting audible tones, the electronic device or other device under test can provide signals to the light guide 704 or other light source (or the flash controller module 130 or other device controlling operation of the light guide or light source) to control the background light intensity as determined by the screen light 716. In some such embodiments, the electronic device or other device under test sends out software-controlled "chirps" (or "beeps" or other sounds) via loudspeaker, and the electronics in the test fixture (e.g. associated with the light guide 704 or the flash controller module 130) detect the chirps and change the background light intensity to the level(s) communicated.

Such operation involving the providing of audible sounds can be particularly useful in circumstances when there is a desire to take multiple latency measurements to determine how the camera-to-display latency will vary with background lighting conditions. In some cases, latency measurements can be taken on a repeated basis, with one or more measurements being taken for each of one or more background lighting settings as provided by the illuminated objective screen. In some additional embodiments, it is also possible for such chirps or other audible tones to be used to control the lighting provided by one or both of the LEDs 120, 122 or other light sources, instead of or in addition to controlling the lighting provided by the illuminated objective screen.

In view of the above discussion, it should be appreciated that embodiments encompassed herein can provide advantageous operation. Among other things, using at least some such embodiments, it becomes possible to log the detection of optical events—either optical events from an external device, or optical events from the mobile device display—by logging the resulting touch reports. Thus, at least some such embodiments can provide a fast and simple way to measure the real-time latency between an external optical event, and the capturing and displaying of that event by a mobile device. As such, at least some such embodiments enable rapid quantitative analysis of a highly visible aspect of performance of a mobile device (or other electronic device), the camera-to-display latency thereof. At least some such embodiments can be implemented with minimal hardware that can be placed, in at least some circumstances, on a physical office workspace, and therefore can be well-suited for the activity of software development. This is by contrast to conventional methodologies for determining camera-to-display latency, which can require special equipment and operating environments that are generally not conducive to rapid testing or development.

Further, in at least some embodiments, the test setup/system can serve as a test fixture for manual or automated camera-to-display characterization of multiple software builds. An important aspect of this operation is the ability to characterize the impact on camera-to-display latency that is incurred by running (or running under) certain operating conditions, such as the running of certain applications, including both user-applications and daemons, either individually or simultaneously. Also, in at least some embodiments, the test setup/system hardware is simple and self-contained, and no external sensors or personal computer-based (PC-based) tools are required. Additionally, in at least some embodiments, the test setup/system is low-cost, and can be easily manufactured and deployed locally or commercially. Further, in at least some embodiments, the test setup/system is compatible with all cameras, and/or is compatible with both LCD and organic light-emitting diode (OLED) displays. Also, in at least some embodiments, the test setup/system is compatible with mutual-capacitance and absolute-capacitance touch technologies. In at least some embodiments, the test setup/system is particularly helpful insofar as it can be used to characterize in real time the impact of software changes on camera-to-display latency.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A method of determining a camera-to-display latency of an electronic device having a camera and a touch-sensitive display, the method comprising:
    receiving first light at the camera;
    receiving second light at a first photosensitive structural portion essentially simultaneously as the receiving first light at the camera, the first photosensitive structural portion being adjacent a first portion of the touch-sensitive display;
    detecting a first simulated touch input at a first time at the first portion of the touch-sensitive display in response to a first actuation of the first photosensitive structural portion occurring as a result of the receiving second light;
    receiving third light at a second photosensitive structural portion, the second photosensitive structural portion being adjacent a second portion of the touch-sensitive display, and the third light being generated by an optical display portion of the touch-sensitive display in a manner that is based at least indirectly upon the first light received at the camera;
    detecting a second simulated touch input at a second time at the second portion of the touch-sensitive display in response to a second actuation of the second photosensitive structural portion occurring as a result of the receiving third light; and
    determining the camera-to-display latency based at least indirectly upon a difference in the first time and the second time.

2. The method of claim 1, further comprising:
    positioning the first and second photosensitive structural portions adjacent the first and second portions of the touch-sensitive display, respectively.

3. The method of claim 1, further comprising:
    providing a first conductive path from the first photosensitive structural portion to ground so as to generate the first simulated touch input, the first conductive path occurring due to the second light impacting first photosensitive material included within the first photosensitive structural portion.

4. The method of claim 3, further comprising:
    providing a second conductive path from the second photosensitive structural portion to ground so as to generate the second simulated touch input, the second conductive path occurring due to the third light impacting second photosensitive material included within the second photosensitive structural portion.

5. The method of claim 1, further comprising:
    positioning a first light source in relation to the camera.

6. The method of claim 5, further comprising:
    positioning a lens between the first light source and the camera to generate the first light.

7. The method of claim 6, further comprising:
positioning a second light source in relation to the first photosensitive structural portion to generate the second light.

8. The method of claim 7, further comprising:
actuating the first light source and the second light source essentially simultaneously.

9. The method of claim 6, further comprising:
positioning the electronic device within a test fixture that blocks external light outside the test fixture from entering into to the test fixture, prior to the receiving first light at the camera.

10. The method of claim 1, further comprising:
actuating the optical display portion so as to generate an image based at least indirectly upon the received first light, prior to the receiving third light.

11. The method of claim 1, further comprising:
providing an illuminated objective screen portion having first and second holes, wherein the first hole is positioned so that the first light can pass through the illuminated objective screen portion from a first light source to the camera, and wherein the second hole is positioned in relation to the first hole so that a dark region is displayed on the optical display portion at a location substantially aligned with the first photosensitive structural portion, whereby the dark region serves to prevent a false activation of the first photosensitive structural portion that might otherwise occur.

12. The method of claim 1, further comprising:
outputting an audible sound from the electronic device; and
controlling light emission based on receipt of the audible sound.

13. A system for determining a camera-to-display latency of an electronic device having a camera and a touch-sensitive display, the system comprising:
a first light source positioned so that, when first light is generated by the first light source, the first light is received by the camera;
a first photosensitive structural portion positioned adjacent to a first surface portion of the touch-sensitive display;
a second light source positioned so that, when second light is generated by the second light source, the second light is received by the first photosensitive structural portion;
a second photosensitive structural portion positioned adjacent to a second surface portion of the touch-sensitive display, the second surface portion being aligned with a further portion of an optical display panel of the touch-sensitive display from which third light is expected to be emitted at least indirectly in response to the camera receiving the first light; and
at least one processing device configured to:
control actuation of the first and second light sources; and
determine a difference between a first time at which a first simulated touch occurs at the first surface portion of the touch-sensitive display upon the second light being received by the first photosensitive structural portion and a second time at which a second simulated touch occurs at the second surface portion of the touch-sensitive display upon the third light being received the second photosensitive structural portion.

14. The system of claim 13, further comprising:
a lens positioned between the first light source and the camera.

15. The system of claim 13, wherein the at least one processing device includes a first processing device that is external and distinct from the electronic device.

16. The system of claim 15, wherein the first processing device is a flash control module, wherein the first and second light sources include first and second light-emitting diodes (LEDs), respectively, and wherein the first and second LEDs are connected in series with one another between first and second terminals of the flash control module.

17. The system of claim 15, wherein the at least one processing device includes a second processing device that is located within the electronic device, wherein the second processing device receives first and second signals respectively indicative of the first and second simulated touches, respectively.

18. The system of claim 15, wherein the touch-sensitive display includes a capacitive touch panel and a first component is positioned adjacent to the first photosensitive structural portion and a second component is positioned adjacent to the second photosensitive structural portion.

19. The system of claim 13, wherein at least one of the first and second photosensitive structural portions includes Cadmium Sulfide material.

20. The system of claim 13, wherein at least one of the first and second photosensitive structural portions includes a metallic touch electrode and a phototransistor.

21. The system of claim 13, further comprising:
a test enclosure in which the electronic device can be positioned during determining of the camera-to-display latency of the electronic device.

22. The system of claim 13, further comprising a screen positioned between the first light source and the camera, wherein the screen includes a first orifice aligned with a path extending between the first light source and the camera and a second orifice positioned at a location relative to the first orifice such that an additional dark image portion is provided by the touch-sensitive display at the first surface portion, and an additional light source causing the screen to emit background light that can be received by the camera.

* * * * *